US005324383A

United States Patent [19]

Lang

[11] Patent Number: 5,324,383

[45] Date of Patent: Jun. 28, 1994

[54] APPARATUS FOR FORMING LAMINATED CORRUGATED MATERIALS

[75] Inventor: Robert A. Lang, Atlanta, Ga.

[73] Assignee: Lin Pac, Inc., Atlanta, Ga.

[21] Appl. No.: 903,978

[22] Filed: Jun. 26, 1992

Related U.S. Application Data

[63] Continuation-in-part of Ser. No. 524,352, May 16, 1990, Pat. No. 5,147,480.

[51] Int. Cl.⁵ ........................ B32B 31/08; B32B 31/18; B31F 1/28

[52] U.S. Cl. .................................... 156/470; 156/472; 156/543

[58] Field of Search ............... 156/470, 210, 205, 277, 156/207, 471, 472, 324, 543; 493/463; 428/182, 186

[56] References Cited

U.S. PATENT DOCUMENTS

| | | | |
|---|---|---|---|
| 2,576,278 | 11/1951 | Bode | 428/186 |
| 2,794,761 | 6/1957 | Williamson | 428/43 |
| 2,829,701 | 4/1958 | Keely | 156/205 |
| 2,943,965 | 7/1960 | Stogre | 428/186 |
| 2,980,159 | 4/1961 | Greene | 156/549 |
| 3,189,502 | 6/1965 | Little | 156/210 |
| 3,256,126 | 6/1966 | Bachofen | 156/210 |
| 3,306,805 | 2/1967 | Klein et al. | 156/470 |
| 3,326,737 | 6/1967 | Hyland, Jr. | 156/470 |
| 3,527,638 | 9/1970 | Sonnichsen | 156/205 X |
| 3,591,436 | 7/1971 | Klein et al. | 156/210 |
| 3,639,194 | 2/1972 | Plunkett et al. | 156/552 X |
| 3,804,688 | 4/1974 | Hillenbrand et al. | 156/205 |
| 4,254,173 | 3/1981 | Peer, Jr. | 428/204 |
| 4,288,273 | 9/1981 | Butler, Jr. et al. | 156/361 |
| 4,339,292 | 7/1982 | Itoh et al. | 156/206 |
| 4,496,417 | 1/1985 | Haake et al. | 156/361 |
| 4,529,462 | 7/1985 | Buinewicz | 156/205 |
| 4,531,996 | 7/1985 | Sukenik | 156/472 |
| 4,544,597 | 10/1985 | Peer, Jr. et al. | 428/182 |
| 4,549,917 | 10/1985 | Jensen, Jr. | 156/108 |
| 4,572,752 | 2/1986 | Jensen et al. | 156/64 |
| 4,576,663 | 3/1986 | Bory | 156/64 |
| 4,610,739 | 9/1986 | Jensen | 156/64 |
| 4,704,171 | 11/1987 | Thompson et al. | 156/64 |
| 4,748,066 | 5/1988 | Kelly et al. | 428/182 |
| 4,871,406 | 10/1989 | Griffith | 156/82 |

FOREIGN PATENT DOCUMENTS

| | | | |
|---|---|---|---|
| 739432 | 7/1966 | Canada | 156/205 |

OTHER PUBLICATIONS

*Product Review–Corrugator Scheduling System Increases Productivity and Improves Flexibility,* International Paper Board Industry, Nov. 1989, at 36, 37.

Jeff Glenister, *Corrugator Scheduling,* International Paper Board Industry, Mar. 1990, at 60, 62, 64.

Mark Arzoumanian, *This Sheet Feeder Loves Dire Straits,* Paperboard Packaging, Apr. 1990, at 64, 66, 69.

"Kiwiplan® Computerized Corrugator Scheduling System" (A four page brochure).

*Primary Examiner*—Michael W. Ball
*Assistant Examiner*—Michele K. Yoder
*Attorney, Agent, or Firm*—Finnegan, Henderson, Farabow, Garrett & Dunner

[57] ABSTRACT

Apparatuses and processes for laminating a finish layer of paper, plastics, film, foil, and other thin sheet material to corrugated material along a corrugator line. The finish layers may be single layer or composite material and are preferably, but not necessarily preprinted, reverse printed, etched or otherwise. The finish layers may be produced, supplied and run in any desired width to suit a customer's needs, without the need to engage in the planning, expense and scheduling necessary to run an entire full width roll of preprint material as single face or double face liner on the corrugator, and without the problems inherent in applying graphics to containers or cartons during the conversion process.

11 Claims, 5 Drawing Sheets

APPARATUS FOR FORMING LAMINATED CORRUGATED MATERIALS

BACKGROUND OF THE INVENTION

The present application is a continuation-in-part of U.S. patent application Ser. No. 07/524,352, filed May 16, 1990, now U.S. Pat. No. 5,147,480.

FIELD OF THE INVENTION

The present invention relates to apparatuses and processes for laminating paper, plastics, film, foil and other thin sheet materials to corrugated paperboard along a corrugator line.

DESCRIPTION OF THE RELATED ART

Corrugated paperboard products are used extensively for a wide range and variety of packaging applications. Such paperboard includes a first, "single face" liner, to which a fluted or corrugated medium is typically bonded via a starch adhesive. A second, "double face" liner is applied to the remaining exposed side of the fluted medium to prepare the corrugated paperboard. Such materials are characterized by their low cost, light weight and strength.

Corrugator Operation

Conventional corrugators contain a single facer unit which receives single face liner from a takeoff roll and medium from another takeoff roll. The single facer unit corrugates the medium between two corrugator rolls, applies adhesive to the fluting and applies the single face liner to the adhesive and medium with a pressure roll. The single face corrugated material continues along the line, sometimes over a bridge or concertina in which it may be folded to allow for changes in operating speed of various portions of the line. The single face corrugated material then enters a double backer glue machine after which it typically receives the double face liner. The double face corrugated material proceeds through a hot and cold traction section which applies pressure with a belt and typically cures the adhesive bond. The portions of the corrugator line which precede the hot and cold traction section are frequently known as the "wet end" or "process end" of the line.

After the corrugated leaves the hot and cold traction section, it proceeds through a rotary shear, a slitter/scorer and a chop knife. These devices shear, slit and score and cut the corrugated to desired specifications before it proceeds to the takeoff section of the conveyor where it typically exits one or both sides of the line. The portion of the line after the hot and cold traction section is typically known as the "dry end."

Early on, conventional corrugators were typically capable of producing corrugated products of only narrow width. This width increased after World War II to typically approximately 87 inches (approximately 221 cm). Over the last ten years, the width has increased to approximately 100 inches (254 cm). These increased widths have lowered the cost of production while computer technology and the process equipment itself have allowed orders for separate customers to be produced on the corrugator simultaneously across the width of the corrugator. The primary disadvantage of increased corrugator width is obviously that unless such orders are simultaneously produced to occupy the full width of the machine, waste and scrap create economic inefficiencies.

At the dry end of the machine, the customers' orders are slit, scored, cut, stacked and then handled separately and extracted from the end of the corrugated individually. The slitter/scorer and the chop knife are now typically automated and can be reconfigured quickly and automatically in order to correctly slit, score and chop various and changing jobs to the customer's specifications. In particular, the dry ends of corrugator lines are now typically configured to cut and otherwise process two or more sets of blanks, corresponding to one or more jobs, simultaneously. It is in fact common for a corrugator to feature two or three chop knives, each of which feeds a separate take-off section. Such chop knives and take off sections may be located at different heights to economize on floor space. The use of multiple chop knives and take off sections increases the versatility of the corrugator to simultaneously produce two or more jobs.

The Scheduling Process

The planning technique for arranging and producing various orders efficiently on the corrugator is known in the industry as "scheduling" or "deckling." Scheduling of jobs to be run on a corrugator has sometimes been described as an art form. Whether done manually or by computer, the task involves many variables. Each job to be run is reviewed for the paper grade required for the inner and outer liner as well as the medium, the number of containers to be run (and thus run length), the length of each container blank to be run (which obviously affects run length) and the width of the container blanks to be run. For instance, in the United States, inner liner, outer liner and medium may be specified by the customer in at least the following grades (in pounds per 1000 square feet): 23, 26, 31, 33, 36, 38, 40, 42, 46, 47, 51, 53, 56, 57, 62, 64, 69, 74 and 90. Various finishes, colors and materials may also be specified. The initial task in scheduling the corrugator is thus to sort the inventory of all jobs for jobs that require the same grade of inner liner, outer liner and medium, and to select the desired or needed paper width.

The selected jobs which share the same grades are then examined by blank width in order to determine how best to maximize the entire width of the corrugator with minimum side waste "trim." The scheduler is constantly aware of his paper inventory and the available paper widths within each grade. Typically a corrugator minimizes its paper inventory by carrying three or four main paper widths in 2" or 3" steps from its maximum machine width. For instance, a 99" machine may carry 99", 96", 93" and 90" widths. In this way, the trimming of the machine allows some flexibility, although the objective is always to aim for the maximum while not allowing the wasted side trim to become too large.

The scheduler is also aware of the dry end machine limitations of slitting and scoring minimums and particularly the number of knife and takeoff stations available. A two knife machine allows part of the web width to be processed by one knife and part by the other; three knives increase the options. For instance, the scheduler may place one customer's order singly or two or three across the web to be processed by one knife, and use the other knife for a totally separate customer's order. By processing jobs through different chop knives, the chopped length of blanks produced by a knife can be independent of the chopped length of blanks produced by the other knife or knives, as may be the total lineal lengths of the jobs. When the job through a knife has been completed, another job of similar width may be started to take the previous job's place; any minor width difference becomes edge trim and thus waste. If the waste becomes too great, the scheduler may decide to reposition his jobs on a narrower width of paper and thus splice in a narrow paper width.

As an example, if a customer has ordered 10,000 containers, each having a 29 inch blank width, the blanks may be scheduled and run three abreast on a 99 inch corrugator, using 90 inch paper. For convenience and ease of handling, one knife and stacker station may process two of the blanks, while another knife and stacker station may handle the other blank. Since the 99 inch corrugator width has not been fully used, an alternative is to find another slightly wider job within the same board grade combination and with a similar overall lineal length to run beside the 29 inch blank or blanks. For instance, a second job for 15,000 containers, whose blanks are 36 inches wide, with a slightly longer blank length, would give a combined width of 94 inches, taking into account two 29 inch blanks. With one or two inches of trim, which is always needed for shrinkage and wander, 96 inch paper width may be ideally used. The 36 inch wide blanks, because they are a separate job, must be processed at the dry end with their own knife and stacker station, however. The obvious difficulty is that one job will have been completed while the other is still running. The remainder of the 29 inch blanks will then be immediately matched with another job to allow it to continue or placed back into the scheduling pool of outstanding work.

The scheduler's job is thus a never-ending job of puzzling together an optimum schedule with minimum side trim waste, in a manner that allows the corrugator to run continuously, and subject to a number of variables, including board grade, paper width, blank width, and total lineal length. Computers have automated aspects of this complex task, and have particularly allowed flexibility in scheduling in order to accommodate customers who require "just-in-time" delivery, small orders and both. Such automated control also allows the various components of the corrugator to be more precisely synchronized so that production speeds of 400 to more than 1000 feet per minute are both possible and practical.

Although there are an infinite number of possible board grades, the industry in North America has tended to settle into using a relatively small number (three to six) of common grades in order to accommodate paper manufacturers and the trimming and scheduling problems of the corrugated industry mentioned above. Perhaps the greatest number of corrugated containers, probably in the range of approximately 90%, are formed of natural kraft brown color board. Although the other 10% is a growing segment, it is still a small segment, and it comprises bleached white corrugated or mottled white, typically n the outer surface only for display purposes, and other specialized board grades. The scheduler thus has far more scheduling choices with the popular kraft brown board grades, and the bleached whites, mottled whites and specialist board grades present scheduling problems.

In order to overcome the scheduling problems presented by the typically narrow ranges of jobs which may be produced at any one time and thus scheduled with bleached whites, mottled whites and specialist board grades, the scheduler normally allows more wasted side trim and frequently upgrades the liner weight into the next heavier paper grade to be compatible with other jobs. On very rare occasions, a job requiring specialist paper grade is capable of being produced by scheduling multiple blanks across the corrugator web with minimum side trim; such a job is known as a "self-trimmer." It is in this narrow situation that preprints are typically used.

Preprint Liners And Associated Problems

Preprint liners are liners which have been printed in a process prior to the corrugation process, and in a manner that allows the quality and complexity of the applied graphics and print to be dramatically enhanced over that of printing which takes place during conversion after the corrugation process. Because such liners almost always feature enhanced graphics, they tend to be printed o specialist and more unique papers which are often considerably more expensive than standard grades. Such papers must have the proper surface texture to accept fine printing, but yet have the requisite strength and ruggedness necessary to provide the structural strength component required in the finished container or to withstand the abuse of being dragged through the hot and cold section of an operating corrugator.

The obvious problems associated with attempting to schedule two or more preprint jobs on one run almost always require the preprint jobs to be run as "self-trimmers." The typical only exception is when a particular customer places two orders which may be run simultaneously, which require the same specialist papers, the graphics of which may be produced on the same roll (using the same equipment at the same time) by the preprinter, which may be scheduled across the corrugator web width with minimum side trim waste, and which allow enough advance notice for the order to be placed with the preprinter.

Preprints, furthermore, often require special width mediums and inside liners in order to fit the customer's needs. For example, if the corrugator is of a maximum width of 99" and the width of the blank is 17", then five widths, which total 85", would fit the machine. An 86" or 87" paper width should thus be run, but those sizes may not be in the normal inventory of, for instance, 90" and above. A small specialist lot of 87" medium and inside liner would thus be required. Not only is use of the corrugator width not maximized, but extra waste is incurred as there is bound to be extra board left on some rolls after the job is completed. (Preprint, the most expensive component, is almost always consumed totally if possible, leaving the medium and inside narrow-width liner rolls still containing board, which must be absorbed as waste.)

Additionally, set-up labor, time and expense usually make it cost-prohibitive to run less than a roll of preprint. A typical roll of preprint produces approximately 80,000 to 100,000 square feet or around 12,000 lineal feet of product, resulting in approximately 12,000 containers. At speeds of up to 1000 lineal feet per minute, the run may require only 20 minutes at most. Although single roll preprint runs are attempted by some corrugators, the additional settling down period encountered in producing acceptable product tends to make runs of 50,000 to 100,000 containers and above (4 or more rolls) more normal.

Preprint liners are additionally often heavily impregnated with inks and are therefore difficult to get started on the corrugator due to excessive friction in the hot and cold traction section. That friction can also lead to scuffing and surface damage to the finish of the product.

Additional complications in running preprint result from the need to ensure proper registration of the graphics with the slitter/scorer and chop knife. The preprint is applied at the beginning of the hot and cold traction section, many feet away from those components. This distance, the heat involved and the rapid operating speed of the corrugator, on the order of between 400 and 1000 feet per minute as mentioned above, requires very precise synchronization of the chop/knife and slitter scorer with the earlier parts of the line. Graphics misalignment early on in the run typically results.

A further complication arising from use of preprint being applied at a lengthy distance from the dry end of the line, is that quality control of the corrugated is typically monitored and defects are most often noticed at the dry end of the line. Thus, a defect which occurs at the wet end of the line is not noticed, so that correction measures can be undertaken, until after many additional feet of expensive preprint have passed through the wet end of the line and the hot and cold traction section only to form defective product.

In addition to these problems associated with preprint, there are presently a limited number of preprinters who have invested the necessary capital in newly developed and expensive central impression multi-color printing process of sufficient width to form the wide rolls of preprint necessary for the newer corrugating machines. As a result, preprint in 90-inch widths is expensive.

In short, although use of preprint liner on a corrugator line can produce beautiful graphics under ideal circumstances, the process is fraught with problems, costs and inflexibility.

Conversion Graphics

The advent of preprinting full width rolls of paper prior to corrugating enhanced both the quality and complexity of graphics available for the corrugated container industry. This major step did not, however, address the problems of short run business. Short run business, or jobs ranging in size from 500 cartons or fewer to approximately 5000 cartons, is a rapidly expanding segment of the industry as smaller inventories are maintained and just-in-time deliveries are more frequently demanded. As a result, simple graphics without the technical superiority of preprint continue to be applied to corrugated containers in the vast majority of cases during the conversion process. By "conversion" is meant the process which occurs after the corrugated blank leaves the dry end of the line, and is printed, slotted, scored, cut and joined on separate conversion machines to meet the customer's specifications. The conversion process may occur in the same plant as the corrugator, at a separate conversion plant or at the customer's location.

Application of graphics during the conversion process typically takes the form of flexo graphically printing directly onto the liner of the combined board or application of "labels"—paper or other layers, laminates or composites. A number of different machines are used both to laminate additional coatings onto such sheets and to print the needs of each individual customer during the conversion process. A typical box making operation, for instance, may include three or four separate slotting and printing machines and two or three offline laminators.

The quality of print applied directly onto the face of the combined board during conversion is typically degraded because of the ridged and irregular corrugated surface to which the print must be applied. Frequently, application of pressure sufficient to print compresses the fluted medium and decreases overall strength of the finished container. Printing or graphics applied to corrugated paperboard during the conversion process (after the paperboard has been formed) are thus generally inferior in quality, as is the quality of the finished product itself.

Labels may also be applied during conversion in order to place graphics onto cartons via litho laminating and similar techniques. This approach overcomes the problems associated with printing on ridged liner surfaces and thus results in higher-quality graphics, but it is a separate and slow operation which is labor intensive. Present label material is also subject to cracking at box scores and other locations. Such difficulties, combined with the additional capital equipment required in order to apply label graphics, detract from the efficacy of this process and make it the most expensive of the alternatives available to apply graphics to corrugated containers.

Offline conversion machinery manufacturers have continued to develop more sophisticated techniques for printing containers and the cost of such machines have escalated, in an effort to improve quality of offline conversion graphics. As an example, a typical cost to produce present day corrugated is $33 to $35 per 1000 square feet, or $0.33 to $0.35 per container, assuming the container requires a blank which occupies ten square feet. Use of a roll of preprint during the corrugation process increases the production cost of the corrugated to between $65 and $100 per 1000 square feet, or between $0.65 and $1.00 per 10 square foot container. By contrast, application of label graphics in an offline conversion process results in typical production costs of between $0.90 and $1.30 per 10 square foot container In short, the slow downstream production speeds possible with conversion label graphics, the labor expense and the added capital cost of the necessary equipment make this option unaffordable to many small businesses.

Despite these shortcomings, the point needs to be made that the industry is accustomed to the seemingly inefficient corrugated container to which label graphics have been applied during the conversion process, and thus which contains yet another layer on top of the outer liner.

Non-Graphics Conventional Corrugator Coating Techniques

Looking at the background of the present invention from another perspective, layers of various materials have long been applied to single face liner, corrugated medium and double face liner at various points along corrugating lines. For instance, a well known method of enhancing the corrugating process is to color coat, spray, wipe or otherwise apply chemicals or pigments across the width of the board. Typical hemicals include water protectives, fire retardants, silicon releases and pigmented materials. Similarly, such coatings have been applied to only portions of the entire width of the corrugated as it is being formed.

Previous processes also include laminating additional layers at the wet end of a corrugating line. For instance, weak points of containers (such as the areas around box scores) are frequently strengthened by applying narrow webs of additional liner approximately two to four inches wide at the wet end of the corrugator with a suitable adhesive. This lamination allows the main body of the container to be lighter in weight than would otherwise be required. Similarly, high tensile plastic twine or string can be inserted at the wet end between the fluted medium and the liner board to add tear resistance. U.S. Pat. No. 3,256,126 issued Jun. 14, 1966 to Bachofen, U.S. Pat. No. 4,871,406 issued Oct. 3, 1989 to Griffith, and U.S. Pat. No. 4,544,597 issued Oct. 1, 1985 to Peer, Jr., et al. disclose lamination of thermoplastic and other layers at the wet end of a corrugator. The Bachofen patent refers to applying the thermoplastic layer as the double face liner or as an additional layer, while the Peer patent discloses application of a thermoplastic composite material as the double face liner at the wet end.

It is also conventional to apply one-eighth inch to one-half inch plastic tape to the inside liner of the container (single face liner) at the dry end in order to create a rip tape feature which allows for easy opening of the finished container.

No conventional processes of which the present inventors are aware solve the problem of how to produce high-quality graphics associated with preprint and yet avoid running full width rolls of preprint with the attendant planning and inefficiencies associated with such production. Put another way, the inventors believe that many would appreciate being able to use preprint in order to avoid printing during conversion, without having to pay extra for full width preprint, suffer shorter production runs and more frequent down time intervals, and bear the planning and scheduling problems associated with dedicating an entire roll of preprinted liner board to a particular customer.

SUMMARY OF THE INVENTION

The present process allows the flexibility previously available only with offline conversion label graphics application techniques to be combined with the high quality graphics associated with previous use of preprint as single face or double face liner, in order to address the needs of the corrugated industry for low cost, high quality graphics-bearing corrugated board. The present invention thus provides the opportunity for smaller entrepreneurial companies to participate in a growing and profitable corrugated graphics market, a market which has grown in the 1980's to over a $500 million per year industry, but a market which has previously been dominated by the large, heavily capitalized vertically integrated paper companies.

According to the present invention, one or more laminators are used on a conventional corrugator to apply one or more finish layers at the dry end of the corrugator at appropriate times and locations across the width of the corrugated as various jobs are scheduled and run on the corrugator. The finish layers may be of paper, thermoplastic, metal, foil, cloth, film or other thin material of any required width to suit a customer's needs. They are preferably applied at the dry end of the corrugator between the rotary shear and the triplex or slitter/scorer station, but could also be applied at the dry end after the slitter/scorer. The layers may also be applied prior to the hot and cold traction section. They may be a single layer or composite material, and are preferably, but not necessarily, preprinted, reverse printed, etched or otherwise the recipient of graphic images prior to the corrugation operation.

Lamination according to the present invention thus takes place in synchronization and cooperation with the operation of the corrugator, so that the laminators may be started and stopped at desired times to coat desired portions across the width of the corrugated, which correspond to a particular job or jobs, without interfering with the operation of the corrugator. Such lamination is preferably performed in conjunction with slitter/scorers, chop knives and other dry end equipment that are also synchronized to the corrugator; multiple sets of container blanks may then be produced, one or more bearing a finish layer (which may be different from the finish layer on adjacently-produced blanks), and, if desired, one or more bearing no finish layer. Operation and scheduling of the corrugator line thus becomes liberated from the need to worry about scheduling and running preprint.

Briefly, processes of the present invention include first reviewing the inventory of outstanding orders to select jobs which require the same grade of liner. Second, the appropriate paper width is chosen. Third, the selected jobs are selected and ordered for production according to blank width, in order to maximize efficient use of the width of the corrugator web, subject to the fourth step, which is selection and ordering of the jobs according to blank length and number of containers required in order to maximize efficiencies associated with long production runs. Fifth, the corrugated is produced on the corrugator line according to the schedule. Sixth, laminators according to the present invention, acting in coordination with the schedule, apply one or more finish layers of predetermined width and length at one or more desired locations across the width and along the length of the corrugator, preferably (but not necessarily) at its dry end, as the portion of the corrugated which corresponds to the job requiring the finish layer passes such locations.

Although the lamination of an additional layer of material onto corrugated paperboard during the corrugating process at first appears to be duplicative, redundant and wasteful and thus counterintuitive, the inventors have found that the advantages far outweigh the disadvantages. First, the finished product resembles the present structure of conventional corrugated to which labelling has been applied during conversion, so that corrugated made according to the present invention will be well accepted by customers. The quality of the product equals or exceeds conventional graphics-bearing corrugated material, with cost savings in at least four areas: (1) production of the printed laminate; (−2) raw material costs (papers, inks, printing plates, transportation costs); (3) corrugator operation costs; and (4) waste and error-generated scrap.

Second, scheduling in order to run preprinted material is vastly simplified according to the present invention, since the preprinted material may be applied to corrugated that has been formed using conventional grades of liner and medium. Selection and ordering of jobs according to blank width, blank length and number of containers ordered is made easier, since present processes can apply finish layers to plain brown liner or other conventionally desired materials, so that the pool of jobs to be scheduled is large and offers great flexibility.

Third, the present invention offers great flexibility in the type of finish layer that is applied, so that costs are reduced. For example, a very thin layer of bleached paper applied to a container according to the present invention produces a container which has the same attractive appearance of a container whose outer surface is formed of bleached liner. The difference is that bleached liner, which must be bleached through its entire thickness, is far more expensive. Furthermore, thinner bleached layers retain less dioxins and other environmentally questioned materials.

Additionally, processes according to the present invention offer the ability to apply laminates such as plastic-laminated foil or paper, whose plastic layer may be reverse printed with graphics, during the corrugation process. Previously, such materials which were applied at the wet end of a corrugator suffered from the registration problems mentioned above that are associated with applying them a long distance from the slitter/scorer and chop knife on a fast-moving line, in the absence of exact synchronization of all elements of the corrugator. Such materials are also frequently scuffed, abraded and subject to deformation in the hot and cold traction section of the corrugator when applied at the wet end. The present invention avoids those problems, and it avoids the great expense associated with applying such laminates to individual sheets during the offline conversion process.

As another advantage, processes according to the present invention can laminate a high-quality finish layer to liners that are formed of recycled material. Recycled materials in the United States are presently of inferior quality and reduced brightness, and thus unacceptable for high quality finish and graphics, because of the residual inks and foreign material that have not been removed during recycling. Those inferior qualities do not interfere with the ability of processes of the present invention to add a thin finish layer to produce a container that is visually attractive and environmentally responsible.

In any event, it is commonly known in the paper industry that finer grades of printing paper are mainly produced i the lightweight non-corrugating grades. They are instead typically produced for such end uses as magazines, posters, wrapping paper, wall paper and offset labels, and they are printed using high-speed rolls or sheet-fed printing processes (i.e., gravure, web offset, litho and high graphics flexo). Such papers lack the strength and ruggedness necessary to suffice as a structural component of corrugated board, or to withstand the abuse of being dragged through the hot and cold section of a typical corrugator. But by applying these papers as laminates, the present invention makes this lack of strength and ruggedness irrelevant while at the same time taking advantage of the high quality graphics and the plentiful supply of such papers, all at a savings in cost. For example, a typical clay-coated preprinted liner having requisite strength and grade to withstand the abuse of the corrugation process while also having the fine surface texture necessary for high quality graphics typically presently costs approximately $16 per 1000 square feet. A similar weight ordinary brown kraft liner used every day on a corrugator costs approximately $8 per 1000 square feet, and a lightweight high quality graphics paper (approximately $4 per 1000 square feet) laminated according to the present invention, the overall cost is approximately $13 per 1000 square feet with adhesive, to produce a savings of approximately $3 per 1000 square feet. Therefore, by increasing the total weight of paper used, the laminating processes according to the present invention actually decrease the overall cost, in addition to dramatically simplifying the scheduling process and eliminating the process waste caused as preprint settles down during the beginning of a run on a 400 foot corrugator.

Fourth, mechanical flexibility accorded by present processes is almost limitless. Various preprinted materials can now be applied wherever desired across the width of the corrugator, at any time during the corrugation process. Application of preprint or laminates can begin and end without stepping the corrugator simply by controlling the lamination station. Very small runs of differing and esoteric finish layers are now simple operations. In part because the additional adhesive and finish layer add considerable strength to the finished product, a lighter stock of single face, double face and/or medium may be used in order to offset increases in weight and expense which would otherwise occur from the additional raw material.

Furthermore, the operation of the laminators is independent of scheduling of the corrugator, and application of laminates does not affect the type of single face or medium board that must be scheduled, or otherwise affect the structural requirements of the corrugated product to be scheduled or produced.

The finish layer may be produced, supplied and run in any desired width to suit a customer's needs. Accordingly, the preprint material may be formed by preprinters who are presently producing preprint in narrower width for other industries and who are not required to invest in and charge for use of full width (90 inches or more) printing machinery.

The narrower preprint width also eliminates registration difficulties and set up requirements presently associated with full width preprint rolls.

Fifth, the present invention additionally eliminates the waste and smearing of graphics as expensive preprint is dragged through the hot and cold traction section. The invention also enhances registration of the graphics with the blank width and scores of formed containers, because the lamination and thus the alignment of graphics occurs adjacent to the scoring, slitting and chopping stations.

Sixth, the present invention eliminates the need for special cutting techniques and equipment which are presently associated with pre-print or litho-label conversion applied graphics and which are necessary with such conventional (clay coated) labels to avoid cracking or checking at the bends of the container. Conversion of such board presently typically requires the use of platen (as opposed to rotary) die cutting, and, in some cases, male-to-female (Matrix) cutting dies. Such complexity and resultant expenses can be avoided due to the nature of the various substrates which can be laminated according to the present invention and since use of clay coated papers for high quality graphics on corrugated board is no longer necessary.

The finish layer is preferably roll fed (but may be sheet fed) and is preferably applied to the double face liner. The double face liner is generally a more appropriate bonding surface because it has been relatively gently joined to the fluting by the conveyor in the hot and cold traction section and thus usually presents a smoother surface than the single face liner which has been applied to the medium via a pressure roll. The upper or single face (inner) liner may also receive a finish layer, and both the single and double face liners may receive finish layers according to the present invention. Similarly, either the inner or outer liner may receive a specialized coating such as wax, finishing, or other desired material as the other liner receives a finish layer according to the present invention.

Roll-fed laminators according to the present invention preferably tension the finish layers via a series of tensioning rolls in order to remove wrinkles and imperfections. They then preferably receive a cold set adhesive such as ethylene vinyl acetate or polyvinyl alcohol. The adhesive may be applied either conventionally via a wiper roll or with a reverse angle doctor blade. A nip roll or pressure roll is used to apply the finish layer to the corrugated, and includes a roll for further reducing wrinkling, buckling and surface imperfections. A grooved roll such as a diamond grooved roll may be used, as may a crown roll.

Although roll-fed laminators are perhaps the simplest type of laminators to use for processes according to the present invention, they do not accommodate a large percentage of present-day conventional high quality graphics product. In simple terms, printing plates are typically wrapped around a cylinder in order to print the desired graphic image. Such cylinders must be of greater diameter for longer images, such as may be appropriate on corrugated containers. The printing industry addresses this problem instead by using smaller cylinders to print the image sideways. Although much cheaper and more conventional magazine-type printers, which are prevalent, can print on rolls, their repeat length is thus restricted. As a result, many printers produce cut sheets of print. Those sheets can then be turned 90 degrees and applied in a sheet-fed laminator according to the present invention. Use of sheet-fed laminators according to the present invention thus avoids the need for larger circumference cylinders and thus additional expense involved in printing graphic images on preprint or other roll-fed paper.

Sheet-fed laminators according to the present invention preferably apply sheets of finish layer to the double-face liner because of its more desirable surface qualities as discussed above. Such laminators may be modified conventional laminators used during conversion. Individual sheets are vacuum-gripped in such laminators to be transferred through glue rolls in order to allow the sheet to stream feed or otherwise be fed directly or indirectly onto the passing corrugated product (whether single or double face).

A single laminating station according to the present invention may be used; the remainder of the width of corrugated may be used for normal, non-printed customer runs. Alternatively, two or more such laminating stations may be used so that several pre-printed jobs can be run at once. The production lengths, spacing and timing of this multiple process are limited only by the technology available at the dry end of the line to accommodate order changes and associated slitting, scoring, cutting and stacking of containers formed on the line. Since the dry end technology is already highly automated and well adapted for responding automatically to slit, score, cut and process boxes according to the schedule, lamination according to the present invention at the dry end takes maximum advantage of this technology for maximum efficiency and flexibility.

As an additional alternative, processes according to the invention may be used to laminate finish layers as described above to single face material while omitting the double face liner. Although this solution may provide raw material savings, it is less flexible because the corrugator's total output is formed of such single face corrugated, some or all bearing a finish layer.

It is accordingly an object of the present invention to provide a corrugating process that includes laminating one or more finish layers at the dry end of the corrugator in order to benefit from the simplified scheduling and other advantages mentioned above.

It is an additional object of the present invention to increase the flexibility of use of preprinted materials in corrugating operations by applying preprinted materials over less than the entire width of the corrugated material.

It is an additional object of the present invention to provide a versatile process for placing graphics on corrugated containers by laminating a graphic-bearing finish layer onto the corrugated at the dry end of a corrugating line.

It is an additional object of the present invention to allow two or more sets of container blanks to be produced simultaneously on a single container, the outer surfaces of each set featuring, independently of the other set, standard brown, mottled white, bleached white, or finish layers with or without graphics.

It is an additional object of the present invention to provide a process for applying graphics to corrugated material which allows two or more finish layers, bearing two or more sets of graphics for two or more customers, to be applied simultaneously, so that the separate applications may be started and stopped independently of one another as the corrugating equipment continues to run.

Other objects, features and advantages of the present invention will become apparent with reference to the remainder of this document. It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE PREFERRED EMBODIMENTS

Reference will now be made in detail to the present preferred embodiments of the invention, examples of which are illustrated in the accompanying drawings. Processes of the present invention may be accomplished on conventional corrugator lines 10 as shown in FIGS. 1 through 6. FIG. 7 is a block diagram which outlines such processes. The scheduling process includes a first step of reviewing the inventory of outstanding jobs in order to select jobs which require the same grade of liner. Such jobs are typically inventoried by liner and medium grade, blank width, blank length, and number of containers required, among other parameters. Here, an additional parameter may be included, that for finish layer specified. Second, a desired width of board from which the corrugated web will be produced is chosen. Third, the jobs which have been selected for common liner and medium grade are then arranged and ordered for production according to blank width, in order to maximize efficient use of the width of the corrugator web. That step is, however, subject to the fourth step, which is the step of arranging and ordering of the jobs according to blank length and number of containers required in order to maximize efficiencies associated with long production runs. These steps are performed in a manner that is known in the industry, by manual or automated means. Fifth, the corrugated is produced on the corrugator line in a conventional manner according to the schedule. Sixth, laminators according to the present invention, acting in coordination with the schedule, apply one or more finish layers of predetermined width and length at one or more desired locations across the width and along the length of the corrugator, at its dry end, as the portion of the corrugated which corresponds to the job requiring the finish layer passes such locations. Finally, the blanks are slit, scored, cut and further processed at the take off section. In particular, they are cut and otherwise processed to produce at least one set of blanks, preferably in synchronization with the corrugator and the laminator or laminators, so that multiple sets of blanks may be produced, one or more of the sets bearing a finish layer.

Figure 1:
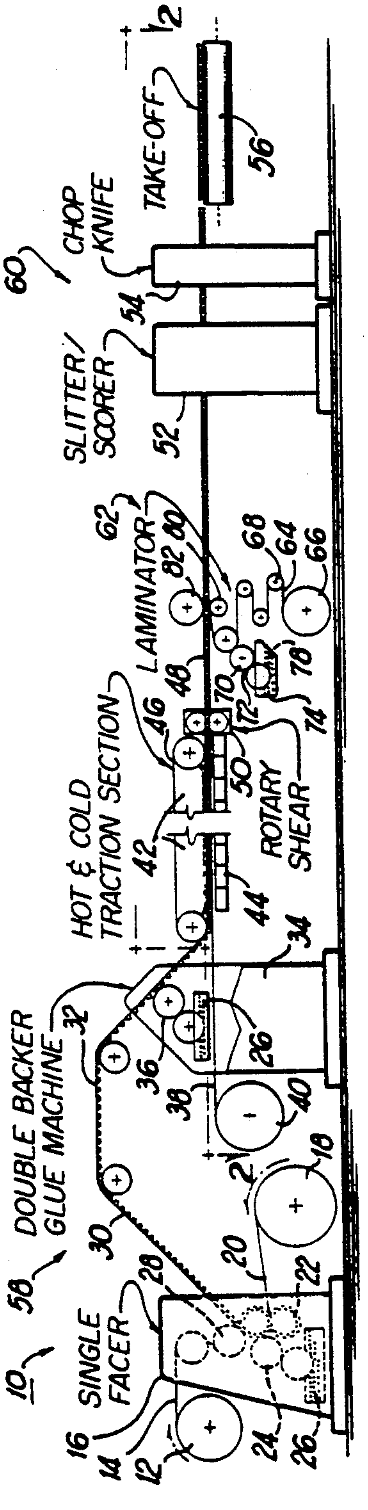
FIG. 1 is a schematic side elevational view of a corrugator line showing a laminator according to a preferred embodiment of the present invention.
Figure 3:
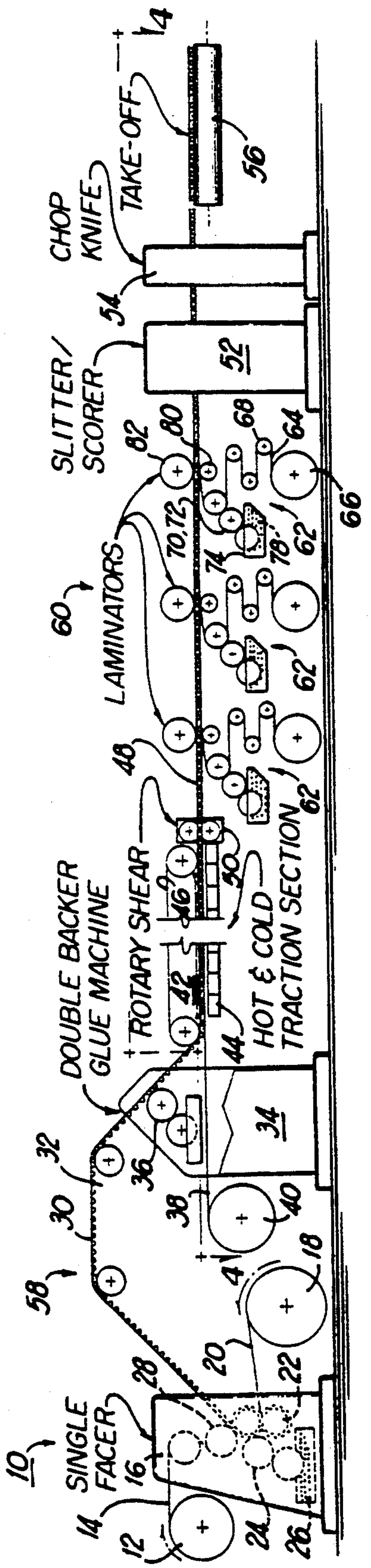
FIG. 3 is a schematic side elevational view of a corrugator line which includes three roll-fed laminators according to a second embodiment of the present invention.
Figure 5:
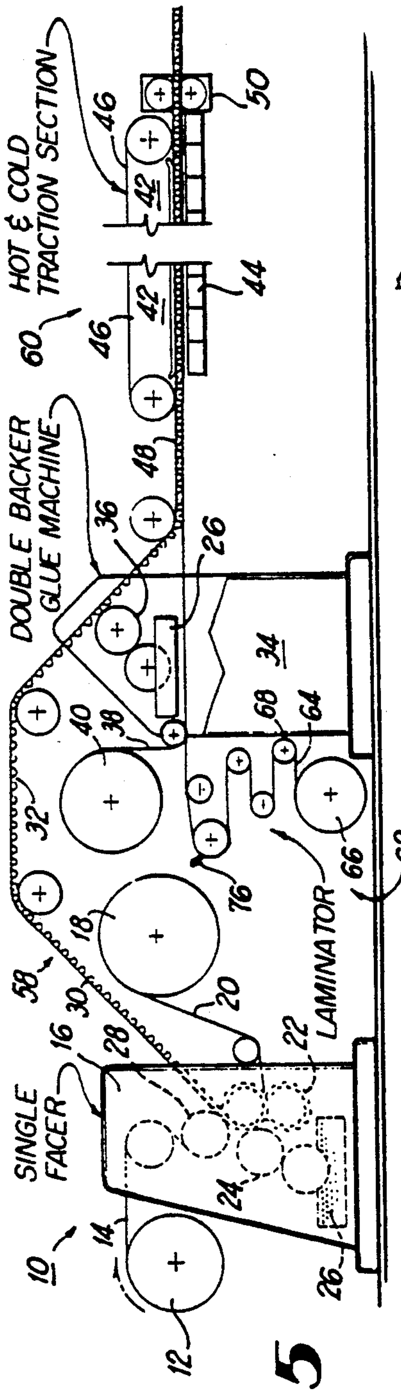
FIG. 5 is a schematic side elevational view of a corrugator line which includes a laminator according to a third embodiment of the present invention.

Lamination processes according to the present invention may occur on a conventional corrugator line 10, as shown in FIGS. 1, 3 and 5, which has been scheduled as mentioned above. A takeoff roll 12 bearing a roll of single face liner 14 which feeds a single facer unit 16. A second take-off roll 18 feeds medium 20 to the single facer unit 16. Medium 20 is corrugated or fluted in the single facer unit 16 via the action of two corrugator rolls 22 according to a conventional process. Applicator 24 then applies adhesive, typically pearl starch 26, to the flutes of corrugated medium 20. Pressure roll 28 applies single face liner 14 to corrugated medium 20 to form single face material 30.

The force of pressure roll 28 against single face liner 14 typically creates a pronounced impression of the flutes of medium 20 on the exterior surface of single face liner 14. Because the ridged surface of single face liner 14 is degraded in appearance and is less receptive to high quality graphics, it typically forms the inside surface of most corrugated cartons.

After leaving single facer unit 16, single face material 30 typically proceeds across the bridge or concertina 32 of the corrugating line 10. Bridge 32 is of sufficient length to allow single face medium to fold over on itself repeatedly in order to create a reservoir of excess single face material 30 which may be used as line 10 is speeded up, slowed down or stepped, and thus to compensate for differing processing rates at various points along line 10 during acceleration and deceleration of line 10.

Single face material 30 descends from the bridge 32 into a double backer glue machine 34. Glue machine 34 contains a separate adhesive applicator 36 which once again applies adhesive 26 to flutes of medium 20. Glue machine 34 additionally receives double face liner 38 from take-off roll 40.

Single face liner 14 and double face liner 38 may be kraft paper, bleached paper, preprint (if desired) or any other type of board or paper typically used in the corrugating process.

Single face material 30 and double face liner 38 are applied to one another through a curing step in a hot and cold traction section 42 which includes hot plates 44 and a belt 46. Belt 46 applies pressure to the newly joined double face material 48 (sometimes "corrugated material") as hot plate 44 dries adhesive 6. The relatively subtle pressure applied by belt 46 decreases translation of ridges from medium 20 flutes through double face liner 38. Double face liner 38 is accordingly less ridged, visually more attractive and therefore typically the exterior layer of corrugated containers.

A rotary shear 50 located at the end of hot and cold traction section 42 shears corrugated material 48 when desired. Corrugated material 48 then typically proceeds through a slitter/scorer 52 and a chop knife 54 to take-off section 56 of line 10. The slitter/scorer 52, which is sometimes known as the "triplex" section, and the chop knife 54, slit, score and chop corrugated material 48 to desired length, width and specifications in order to form carton or container blanks (not shown) which are stacked and then removed from take-off section 56 of line 10.

The portion of line 10 which precedes hot and cold traction section is commonly known as the wet end 58 of line 10, while the portion which follows hot and cold traction section 42 is commonly known as the dry end 60.

Figure 2:
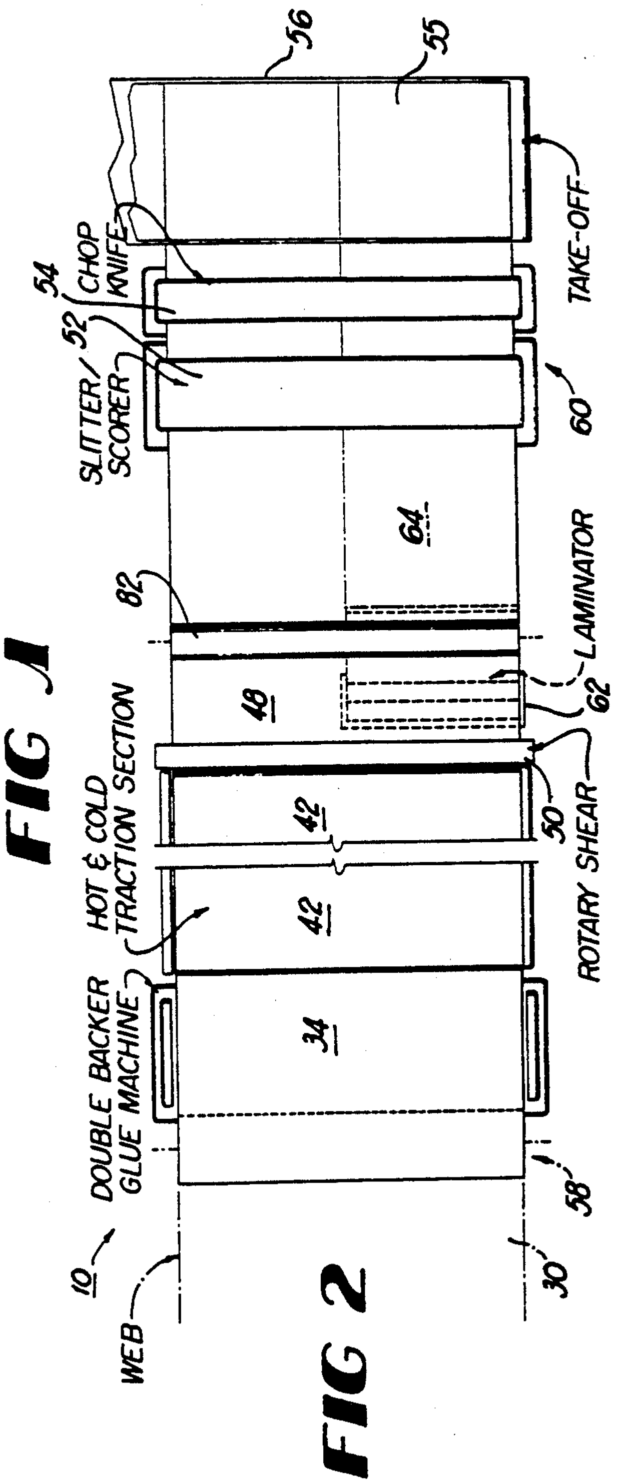
FIG. 2 is a plan view of the corrugator line of FIG. 1.

FIGS. 1 and 2 show a first, preferred embodiment of a laminator 62 according to the present invention. Laminator 62 in the embodiment shown in FIGS. 1 and 2 laminates a width of finish layer 64 which is narrower than the width of corrugated material 48. The remaining width of corrugated material 48 thus represents conventional, non-preprinted jobs which may be run for a customer other than the purchaser of containers formed on line 10 occupied by laminator 62.

Laminator 62 comprises a take-off roll 66 of conventional design which feeds finish layer 64 into tension rolls 68. Tension rolls 68 remove wrinkles, buckles and other surface imperfections from finish layer 64 in a conventional manner. Adhesive applicator 70 receives finish layer 64 from tension rolls 68. Applicator 70 may be a wipe roll 72 as shown in FIG. 1, or more preferably, it is a reverse angle doctor blade to accommodate cold set adhesives which are suitable for the lamination process. Applicator roll 72 and its associated pan 74 result in drying and accumulation of cold set adhesive, and thus applicants have found that a reverse angle doctor blade, which precisely meters and controls flow of such adhesive, is preferable.

Adhesives 78 applied by applicator 60 may be ethylene vinyl acetate, polyvinyl alcohol, solvent based, resin-based, two-step or catalyst, or preferably other cold set adhesives as desired. They will obviously depend in large part on the composition of the particular finish layer 64 that is being applied. One type of adhesive 78 may be preferable for a reverse-printed plastic-on-foil laminate, and other types may be preferable for plastic-on-paper, plastic-on-plastic, paper or other types of finish layers 64. Adhesives 78 may also be hot melt or heat set adhesives such as conventional pearl starches in appropriate cases. That type of adhesive requires heating means which can adversely affect the graphics that appear on finish layer 64, or the properties and appearance of finish layer 64, particularly if it is of plastic material, however. A further option is to preprint a dry adhesive bond to the finish layer 64 which can be set off by either a chemical spray or heat.

A laminator roll 80 applies finish layer 64 to corrugated material 48, in conjunction with a pressure roll 82; the two together may be referred to as, for convenience, a "nip roll." Laminator roll 80 may be a crowned roll, a groove roll or a crown-grooved roll. A crown roll requires that the finish layer 64 always be run on center of crown, which reduces flexibility of the laminator 62 to accommodate different widths of finish layer 64, however. The inventors have found that a straight diamond groove roll is preferable to spread the sheet of finish layer 64 properly along any desired portion of the width of laminator roll 80. Helical pattern or spiral groove rolls, herring bone, chevron, aligner grooves may be used as well.

A particular advantage of the present invention is in connection with production of containers, cartons and packaging which feature high quality graphics. Such containers are commonly known as "high fidelity" containers. Preprinted composites or layers which may be used for this purpose include polypropylene/polyethylene/cellophane extrusion laminated structures, including such structures in which opaque glassine, kraft or other desired paper or polyester material has been substituted for one of the layers, and which may or may not include reverse printing on the outer web. Such laminates are conventional and are disclosed, for instance, in U.S. Pat. No. 4,254,173 issued Mar. 3, 1981 to Peer, Jr. Adhesive laminated composites are also conventional and may be used, either with or without reverse printing on the outer layer. Laminated composites of paper and bioriented plastic film, preferably polyester may be used as well. Application of such composites at the dry end of the line enhances alignment and registration of the graphics with the slitter/scorer and chop knife, which are only a few feet away from the laminator 62. It also eliminates scuffing and degradation which occurs in conventional wet end application processes as the composite is dragged through the line.

Finish layer 64 may take the form of such laminated composites, but it also may be or include any of the following, with or without printing or graphics: plastic film, metallized film, thin rolled cotton or polyester, polystyrene film, thin specialist paper (light or fully bleached), thin preprinted paper, gloss papers or substrates, or other strength- or appearance-enhancing material.

Figure 4:
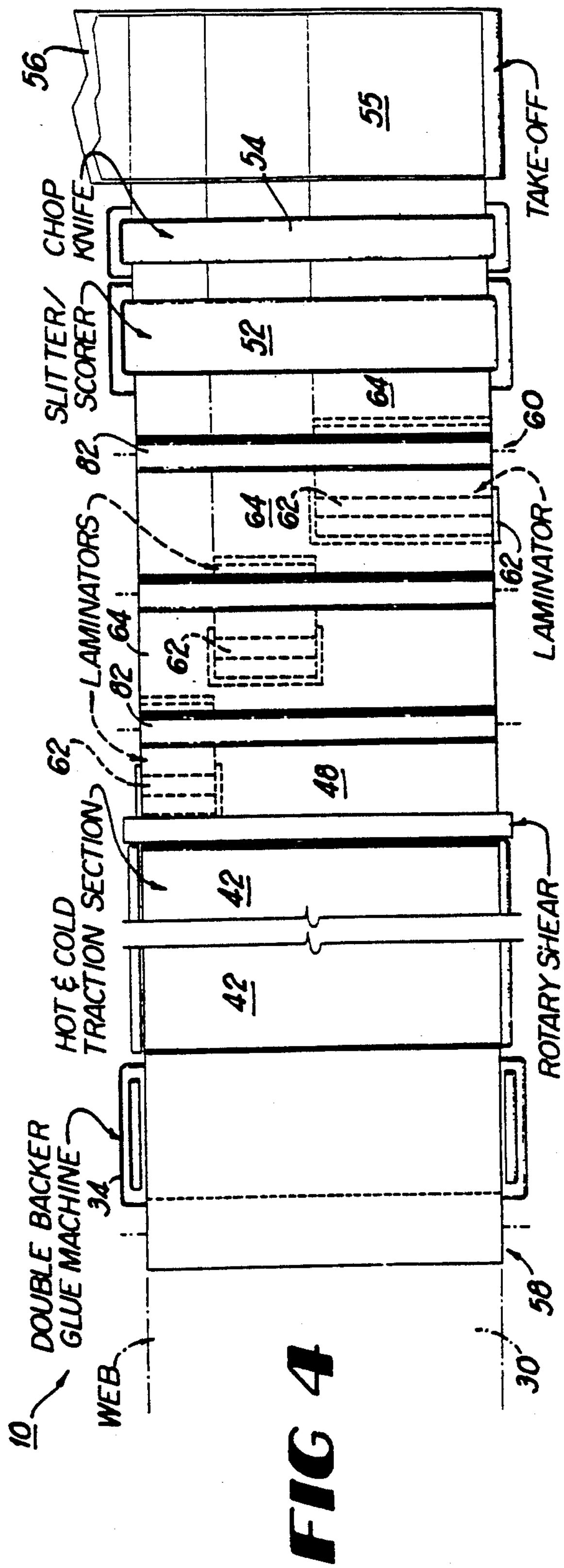
FIG. 4 is a plan view of the corrugator line of FIG. 3.

FIGS. 3 and 4 show three laminators 62 on a line 10. The laminators 62 may all be sheet-fed or roll-fed, and of equal width and simply run narrower widths of finish layer 64 for various customers, as shown. Indeed, they could all be full width if desired, but capable of each running any desired width of finish layer 64. But in a two knife/stacker combination then two laminators, at least a half width and a full width, would likely suffice. In a three knife/stacker combination, a minimum of a third width, a half width and a full width laminator would likely suffice to cover all lamination possibilities. Thus, in a preferred embodiment, on a 98-inch three out line 10, three laminators 62 could be included; a 98" laminator, a 49" laminator and a 23" laminator. Each laminator 62 may contain two take-off rolls 66 for splicing in a finish layer 64 as the finish layer 64 from one of the rolls is depleted, to avoid discontinuities in the finish layer 64. Additionally, a full width laminator could be used to simultaneously laminate two partial width finish layers 64.

Laminators 62 may be started and stopped independently of one another, and independently of operation of line 10 in general for maximum flexibility and minimum down time of line 10. Take-off rolls 66 or sheets of finish layers 64 may be placed at any desired location across the width of a laminator 62 in order to align the finish layer 64 with the portion of corrugated that corresponds to the job which is to receive the finish layer 64.

Figure 6:
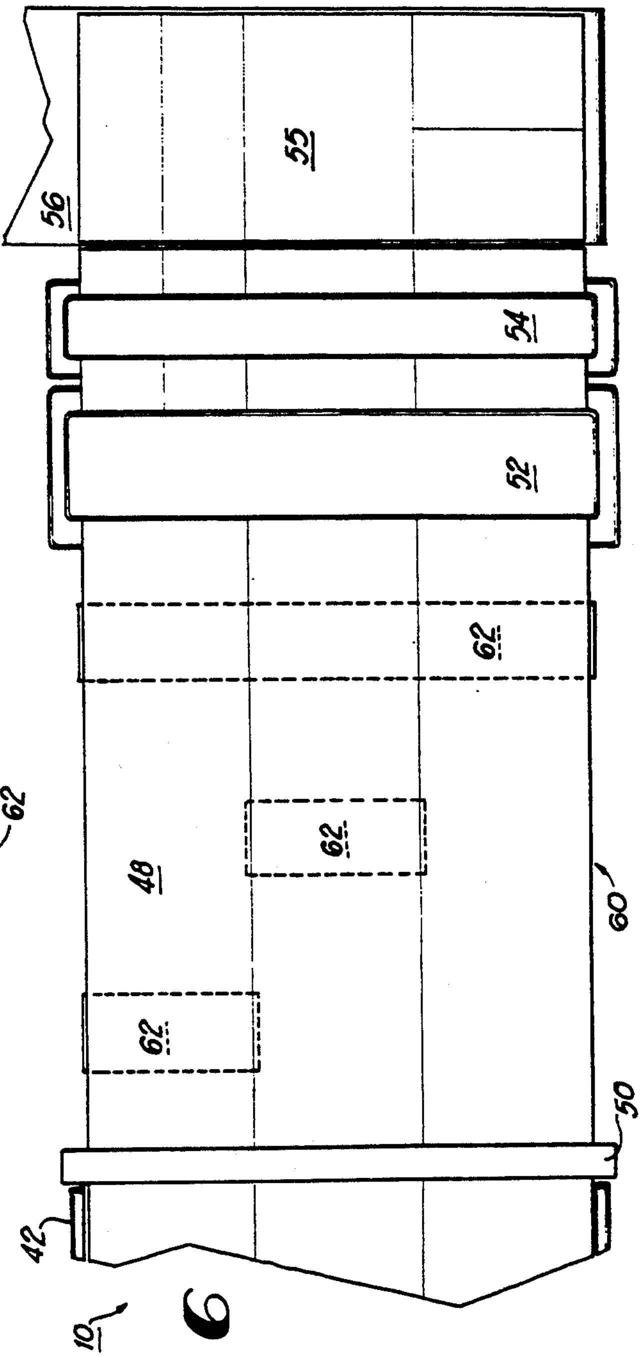
FIG. 6 is a plan view of a corrugator line which includes two partial width sheet fed laminators and a full width laminator according to a fourth embodiment of the present invention.
Figure 7:
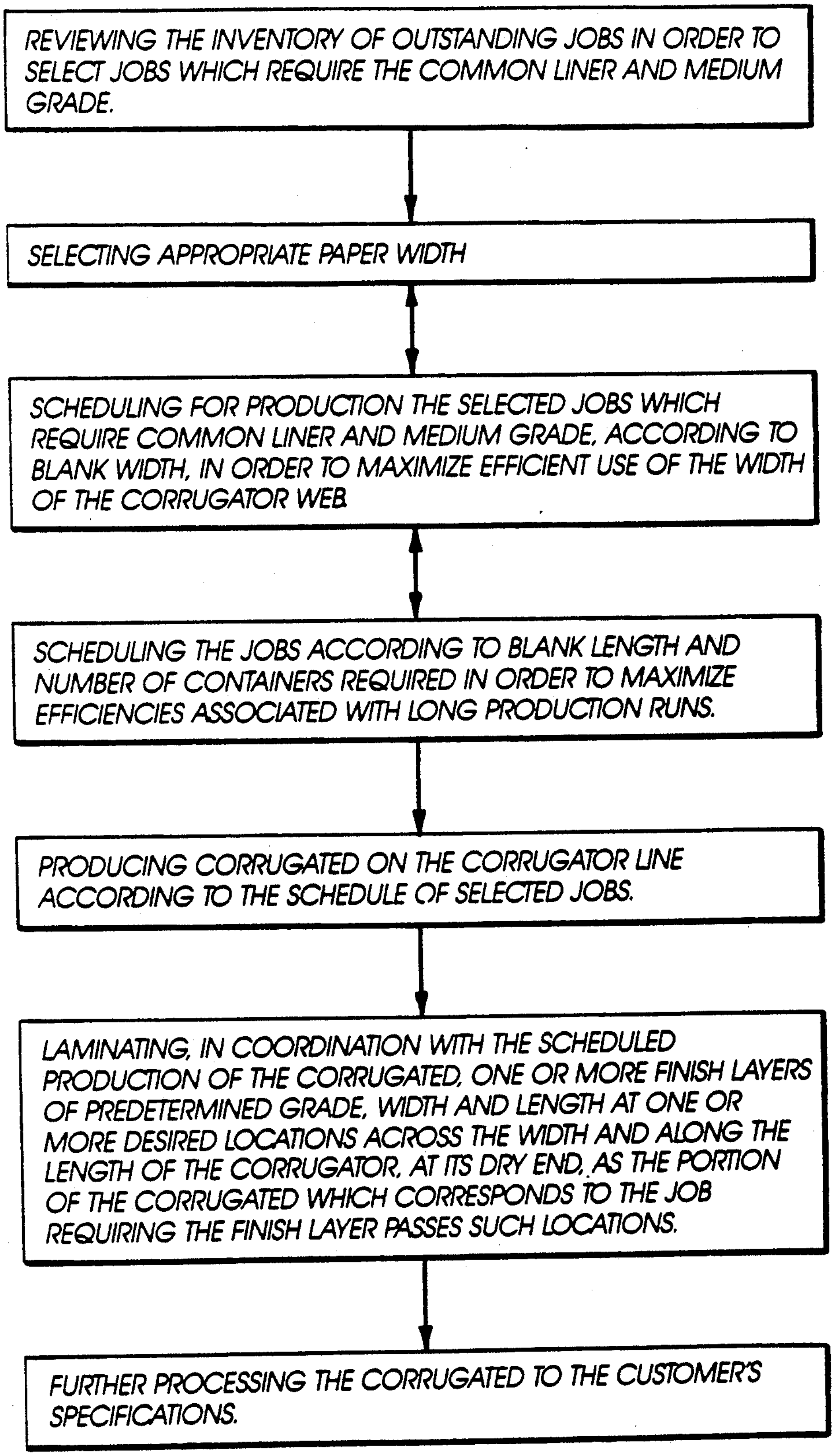
FIG. 7 is a block diagram showing steps according to one process of the present invention.

FIG. 6 shows a full width sheet- or roll-fed laminator 62 combined with two partial width sheet-fed laminators 62 to accommodate full width finish layer 64. A full width laminator 62 may be preferable for lines 10 in which the operator plans sometimes to use full width preprint but also wishes to retain the option to run partial width preprint finish layer 64 for maximum flexibility. Slitter/scorer 52 and chop knife 54 are conventionally automated units and can easily be programmed and configured to accommodate various different jobs across the width of line 10. They may accordingly be easily integrated with various widths of finish layer 64 applied to corrugator material 48 in order to simultaneously form blanks of desired dimensions and graphics for two or more separate customers.

FIG. 5 shows another embodiment of a line 10 of the present invention which includes a roll-fed laminator 62 located at the wet end of the line. This embodiment suffers the disadvantage that graphics on finish layer 64 or the appearance or properties of that layer may be degraded as the material passes through hot and cold traction section 42.

FIGS. 2, 4 and 6 show the flexibility in producing blanks that bear finish layers according to processes of the present invention. FIG. 2, for instance, shows a single roll-fed laminator 62 which applies a finish layer 64 across a portion of the width of the corrugated product 48 in coordination with the production schedule. The laminator 62 may be started when the portion of corrugated product that is to receive the finish layer 64 passes across the laminator 62, and it may be stopped when that portion has passed, without affecting the run speed of the corrugating line 10 itself. The other portion of the corrugated product 48 shown in FIG. 2 is formed without finish layer 64. Slitter/scorer 52 and chop knife 54 cut and otherwise process corrugated product 48 to produce blanks 55. These components are preferably automated, and, where graphics-bearing finish layers 64 are used, they and the laminator 62 act in coordination with the scheduling and running of the corrugator 10 to cut and process blanks in registration with the graphics.

The corrugator line 10 of FIG. 2 is seen producing two sets of blanks 55, one which bears a finish layer 64 and one which does not. Just as easily, the portion of corrugated material 48 which bears no finish layer 64 could be cut and processed into two or more sets of blanks 55, as could the portion of corrugated product 48 which does bear finish layer 64.

FIG. 4 shows a corrugator line 10 which includes three partial-width roll-fed laminators 62. These may be operated at any time to apply finish layers 64 as desired, in order to produce corrugated product 48 that bears or does not bear finish layer. The slitter/scorer 52 and chop knife 54 may, once again, be operated to form one or more sets of blanks 55 from corrugated product 48 that has been laminated (or not laminated) by each laminator 62. FIG. 6 shows two partial width sheet-fed laminators and a full width laminator 62. In either the partial or full width laminator 62, the take off roll or sheet of finish layer 64 to be applied may be narrower than the laminator's width capacity, and may be positioned at any desired location across the width of the laminator 62. The full width laminator 62 increases the ability of corrugator line 10 to apply one or more finish layers 64 at any desired location relative to, or across the width of the corrugated product 48.

Figure 8:
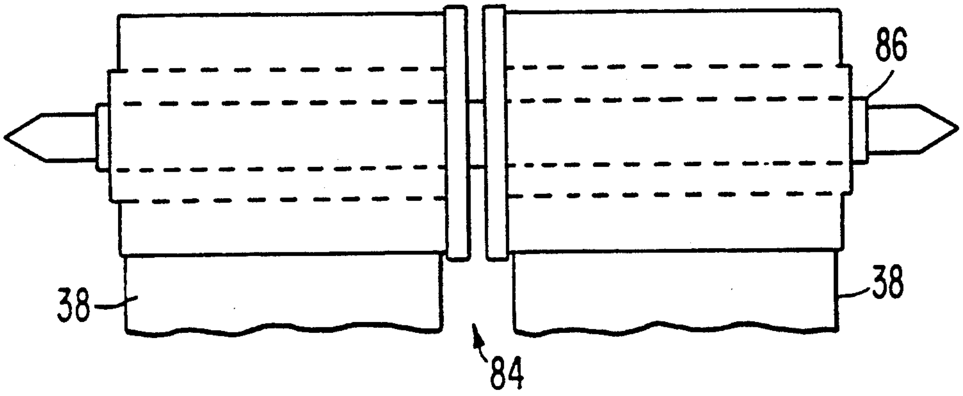
FIG. 8 is a plan view of a pair of feed rolls mounted on a common mandrel according to a fifth embodiment of the present invention.
Figure 9:
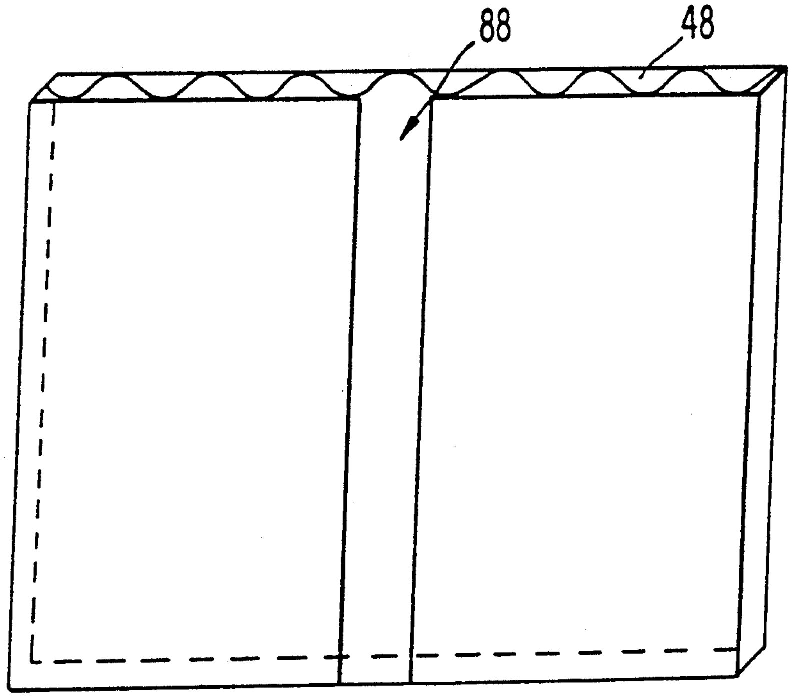
FIG. 9 is a plan view of a corrugated product produced by the pair of feed rollers of the fifth embodiment of the present invention.

In accordance with the present invention, means are provided for producing corrugated blanks from two or more rolls of double face liner, which is adhered to a fluted medium, so that the liner from each roll is spaced along the surface of the blank. Preferably, as shown in FIG. 8, a single roll of double face liner 38 is replaced with a pair of feed rolls 84 mounted on a common mandrel 86. Consequently, as shown in FIG. 9, one surface of corrugated product 48 is formed by a pair of feed rolls 84 of double face liner 38, such that the liner 38 from adjacent rolls defines a space 88 therebetween when the liner 38 is secured to the fluted medium 20.

As embodied herein, if a customer desires a laminated outer surface and another customer desires another outer surface (laminated, preprinted, or otherwise), one of the feed rolls 84 may be used to produce corrugated product for the customer desiring laminated packaging. The other feed roll 84 may provide liner for the other customer and the blank 55 will be cut along the space 88 between the liner 38 from each roll 84. Alternatively, two or more rolls of single face liner 14 may be used independently or in conjunction with multiple rolls of double face liner 38. In operation, the use of two or more rolls of liner material improves scheduling capability, reduces waste, and enhances overall efficiency.

In sum, processes of the present invention may flexibly be utilized on a conventional corrugator to manufacture, in ways never before available, and with efficiency and quality never before achievable at comparable costs, small quantity graphics orders, corrugated featuring high gloss and color surfaces, with or without printing, corrugated featuring high gloss and metallized surfaces, corrugated to which is applied laminated substrates as mentioned above, corrugated to which is applied lightweight and/or high quality papers, corrugated to which is applied waterproofing or vapor barrier layers, either on one or both liners, and corrugated which is covered with any other sheet material that may be useful or desirable on corrugated, including, for example, tyvec, nonwovens, polystyrene, cloth, wire mesh and antistatic substrates. Other embodiments of the invention will be apparent to those skilled in the art from consideration of the specification and practice of the invention disclosed herein. It is intended hat the specification and examples be considered as exemplary only, with a true scope and spirit of the invention being indicated by the following claims.

What is claimed is:

1. An apparatus for forming a laminated product on a corrugating line, comprising:
   - means for feeding a single face liner, a double face liner, and a fluted medium;
   - means for assembling the single face liner, the double face liner, and the fluted medium to form a corrugated material having the fluted medium positioned between the single face liner and the double face liner, wherein the assembling means includes means for curing adhesive applied to the corrugated material;
   - means for laminating a layer to at least one of the single face liner and the double face liner, wherein the laminating means is positioned after the curing means and at a dry end of the corrugating line; and
   - means for cutting the corrugated material having the layer laminated thereto to form discrete sheets of laminated product.

2. The apparatus of claim 1, wherein the curing means includes means for applying heat to the corrugated material.

3. The apparatus of claim 2, wherein the heat applying means applies heat to the double face liner.

4. The apparatus of claim 1, wherein the curing means includes means for applying pressure to the corrugated material.

5. The apparatus of claim 4, wherein the pressure applying means applies pressure to the single face liner.

6. The apparatus of claim 1, wherein the laminating means includes means for laminating at least two layers to one of the single face liner and the double face liner.

7. The apparatus of claim 6, wherein the means for laminating at least two layers includes two feed rolls mounted on a common mandrel.

8. The apparatus of claim 1, further comprising means for tensioning the layer to minimize surface imperfections in the layer that is laminated to the corrugated material.

9. The apparatus of claim 1, further comprising means for pressing the layer to minimize surface imperfections in the layer that is laminated to the corrugated material.

10. The apparatus of claim 9, wherein the pressing means includes a crown roll.

11. The apparatus of claim 9, wherein the pressing means includes a groove roll.

* * * * *